(12) United States Patent
Yoshida

(10) Patent No.: US 6,301,131 B1
(45) Date of Patent: Oct. 9, 2001

(54) DC POWER SUPPLY CIRCUIT

(75) Inventor: Katsuyuki Yoshida, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/559,407

(22) Filed: Apr. 26, 2000

(30) Foreign Application Priority Data

May 18, 1999 (JP) .................................................. 11-137537

(51) Int. Cl.[7] .......................... H02M 1/12; H02M 7/217
(52) U.S. Cl. ................. 363/44; 363/47; 363/126
(58) Field of Search ................... 363/44, 46, 48, 363/47, 132, 17, 20, 21; 320/111, 112, 114

(56) References Cited

U.S. PATENT DOCUMENTS 5,122,721 * 6/1992 Okada et al. ..................... 320/111
5,999,433 * 12/1999 Hua et al. ......................... 363/132

* cited by examiner

Primary Examiner—Peter S. Wong
Assistant Examiner—Rajnikant D Patel
(74) Attorney, Agent, or Firm—Crowell & Moring LLP

(57) ABSTRACT

The DC power supply circuit has a bleeder circuit 3 connected in parallel to a smoothing capacitor C1. The bleeder circuit 3 is adapted to permit electric current to pass therethrough when a voltage developed across the terminals of the smoothing capacitor C1 exceeds a set voltage that is a voltage set within a voltage range from an output voltage value, at which an output current has a maximum value, to an output voltage value, at which an output current is 0.

4 Claims, 3 Drawing Sheets

DC POWER SUPPLY CIRCUIT

BACKGROUND OF THE INVENTION

The present invention relates to a DC power supply circuit for an AC adapter and, more particularly, to a DC power supply circuit enabled to suppress rise of an output voltage thereof by feeding electric current through a bleeder circuit when the output voltage thereof exceeds a preset voltage.

When an apparatus using a DC source, such as a battery, as an operating power supply is operated by power supplied from a commercial power supply, or when an apparatus needing to be supplied with DC current from an external source so as to reduce the size thereof is operated, an AC adapter for rectifying and smoothing voltage signals supplied from the commercial power supply and for outputting resultant voltage signals is used. This AC adapter is configured in such a way as to have a power supply transformer, a rectifier diode, and a smoothing capacitor. Thus, an output voltage thereof changes according to a variation in a load current or in a voltage of a commercial power supply.

The aforementioned prior art for preventing change in the output voltage is proposed in the Unexamined Japanese Utility Model Publication No. Hei 7-23993. That is, according to this prior art, a power supply transformer and a rectifier smoothing circuit are provided in an AC adapter. Moreover, the AC adapter has a constant voltage circuit, to which an output of the rectifier smoothing circuit is led, and sends an output of this constant voltage circuit to an external circuit. Therefore, even when a change in the output voltage of the rectifier smoothing circuit occurs owing to a variation in the voltage of a commercial power supply or in the load current, a DC output sent to the external circuit is stabilized at a constant voltage (incidentally, this prior art will be hereunder referred to as the "first prior art").

Further, generally, the minimum output voltage and the maximum output voltage of an AC adapter are prescribed according to specifications determined correspondingly thereto. Assuming now that the voltage inputted from the commmercial power supply is constant, when the output current increases, the output voltage lowers, as indicated by a line 51 or 52 in FIG. 5. Furthermore, the ratio of a decrease in the output voltage to an increase in the output current increases with decrease in size of the power supply transformer to be used. Therefore, in the case that the power supply transformer of the AC adapter, which is adapted in such a manner as to have an output voltage V1 when an output current is I2, is a small one, when the output current reaches 0, the output voltage rises to the voltage V3. Conversely, in the case of using a large power supply transformer, even when the output current is 0, the output voltage rises only to the voltage V2. Thus, a large power supply transformer is necessary in the case that the output voltage is the voltage V1 when the output current is I2, and that the output voltage is equal to or less than the voltage V2 when the output current is 0. This results in the rise of the cost of the power supply transformer and in the increase in the size of the AC adapter.

As the prior art for avoiding the increase in the size of the power supply transformer, there has been proposed a device configured so that a bleeder resistor is connected in parallel to the smoothing capacitor. That is, in the case that the bleeder resistor is connected in parallel to the smoothing capacitor, even when the output current is 0, electric current flows through the bleeder resistor. Thus, a load current of the rectifier smoothing circuit. Therefore, even when the output current is 0, rise in the output voltage is prevented owing to the effects of electric current flowing through the bleeder resistor. As a result, in the case that a small-sized power supply transformer is used in an AC adapter adapted to output voltage V1 when the output current is I2, the output voltage at the time, at which the output current is 0, is restrained in such a manner as to be equal to or less than the voltage V2 (hereunder, this prior art will be referred to as the "second prior art").

However, in the case of using the first prior art, there is the need for providing the constant voltage circuit in the AC adapter. Thus, the circuit configuration of the AC adapter becomes complex. Moreover, the number of components to be used becomes large. These result in the large shape, complex manufacturing process, and high component cost of the AC adapter.

On the other hand, the second prior art can avoid the aforementioned problem. However, even when this prior art is used, the following problems arise. That is, when viewed from the power supply transformer side to the output side, electric current flows in a load device of the AC adapter. Moreover, electric current flows in the bleeder resistor. Thus, the output voltage of the power supply transformer increases. Furthermore, the heating value of the power supply transformer increases. Additionally, electric current always flows in the bleeder resistor, so that the bleeder resistor generates a large amount of heat. As a result, the rise in temperature of the AC adapter increases. Consequently, dangerous situations, such as combustion, are liable to occur.

SUMMARY IF THE INVENTION

The present invention is created to solve the aforementioned problems. Accordingly, an object of the present invention recited in aspect 1 is to provide a DC power supply circuit that has a bleeder circuit, which is adapted to permit electric current to flow therethrough when an output voltage rises owing to decrease in a load current, to thereby suppress rise in the output voltage during the decrease in the output current, and thereby suppress increase in the heating value thereof even when the power supply transformer is miniaturized.

Further, in addition to the object of the present invention, an object of the present invention recited in aspect 2 is to provide a DC power supply circuit that can simplify the configuration of the bleeder circuit by constituting the bleeder circuit by a Zener diode and a transistor.

Moreover, in addition to the aforementioned objects of the present invention, an object of the present invention recited in aspect 3 is to provide a DC power supply circuit that can suppress increase in the heating value of the bleeder circuit when the output current decreases even in the case that a voltage, at which electric current starts flowing through the bleeder circuit, is set at a low value, by connecting the collector of the transistor to the terminal of the smoothing capacitor through a resistor.

Furthermore, in addition to the aforementioned objects of the present invention, an object of the present invention recited in aspect 4 is to provide a DC power supply circuit that can suppress increase in the heating value thereof even when an AC adapter is small-shaped.

To solve the problems, there is provided a DC power supply circuit according to aspect 1, which comprises a power supply transformer having a primary coil, to which electric power is supplied from a commercial power supply, a rectifier diode for rectifying an output of a secondary coil of the power supply transformer, a smoothing capacitor for smoothing a rectified output outputted from the smoothing capacitor, and a bleeder circuit, connected in parallel to the smoothing capacitor and adapted to permit electric current to flow therethrough when an output voltage exceeds a set voltage that is set within a voltage range from an output voltage value, at which an output current has a maximum value, to an output voltage value at which the output current is 0.

That is, when the output current decreases, and the output voltage exceeds the set voltage, a bleeder current flows through the bleeder circuit. Therefore, when the output voltage exceeds the set value, a load current of a block consisting of the power supply transformer, the rectifier diode, and the smoothing capacitor is a value obtained by an addition of the values of the output current and the bleeder current. Thus, even when the output current decreases, rise in the output voltage is suppressed. Moreover, when the bleeder current flows in the bleeder circuit, the value obtained by an addition of the values of the output current and the bleeder current is small. Therefore, the bleeder circuit generates heat, whereas the power supply transformer and the rectifier diode produce almost no heat. On the other hand, when the output voltage is equal to or less than the set voltage, no bleeder current flows through the bleeder circuit. Consequently, the heating value of the bleeder circuit is 0.

Further, in addition to the aforementioned configuration, there is provided the configuration of the DC power supply circuit according to aspect 2, in which the bleeder circuit comprises a transistor, whose collector is connected to one of the terminals of the smoothing capacitor, and whose emitter is connected to the other terminal thereof, and a Zener diode, adapted to feed a base current into the transistor when a voltage developed across the terminals of the smoothing capacitor exceeds the set voltage. That is, the bleeder circuit is comprised of one transistor and one Zener diode.

Moreover, in addition to the aforementioned configurations, there is provided the configuration of the DC power supply circuit according to aspect 3, which includes a resistor, which is inserted between the collector and one of the terminals of the smoothing capacitor. In this configuration of the DC power supply circuit, the Zener diode has terminals, one of which is connected to the base of the transistor, and the other of which is connected to the collector thereof. That is, when the output current decreases and the output voltage rises, electric current flows through the transistor so that the collector-emitter voltage of the transistor becomes nearly constant. However, the electric current flowing through the transistor is limited by the resistor.

Furthermore, in addition to the aforementioned configurations, there is provided the configuration of the DC power supply circuit according to aspect 4, which is an AC adapter. That is, even when the size of the AC adapter is reduced by miniaturizing the power supply transformer, the total heating value thereof remains at a limiting value.

DETAILED DESCRIPTION OF THE PREFERRED EMBODIMENTS

Hereinafter, embodiments of the present invention will be described with reference to the accompanying drawings.

Figure 1:
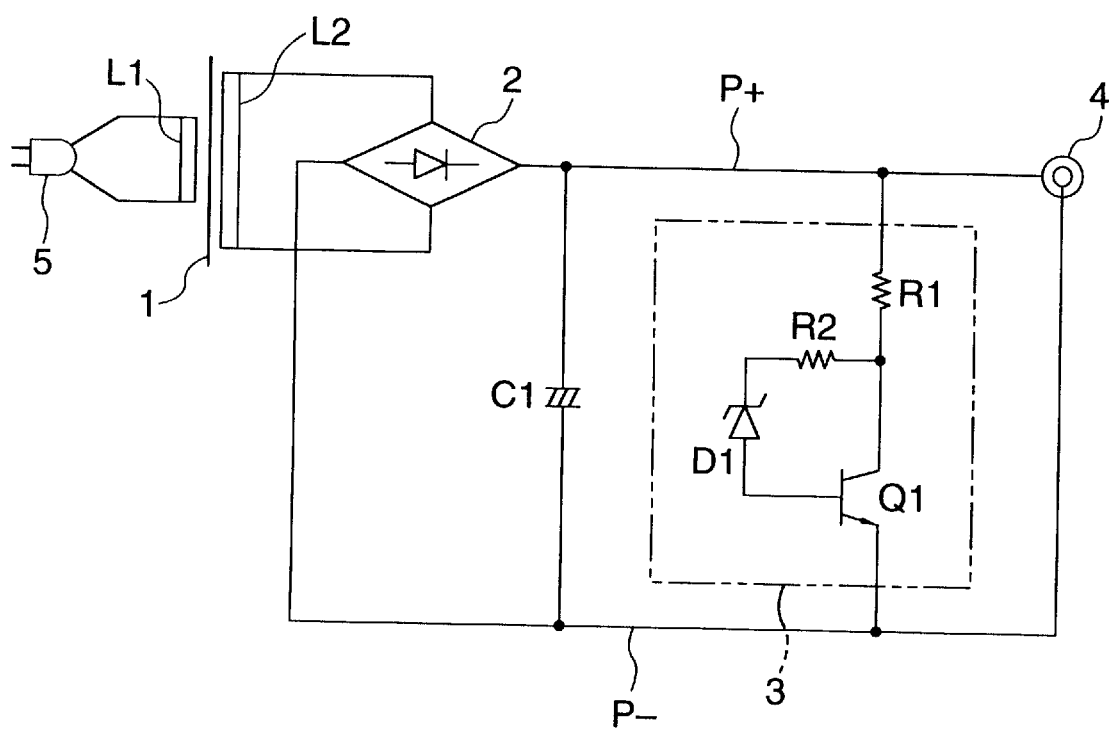
FIG. 1 is a circuit diagram illustrating the electrical connection of componets of an embodiment of a DC power supply circuit.
Figure 2:
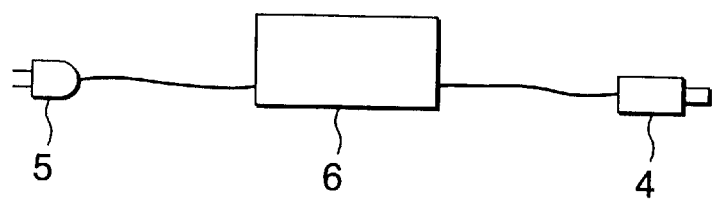
FIG. 2 is a diagram schematically illustrating an external view of the embodiment.

FIG. 1 is a circuit diagram illustrating the electrical connection of components of an embodiment in the case that the DC power supply circuit of the present invention is applied to an AC adapter. FIG. 2 is a diagram schematically illustrating an external view of the AC adapter.

As shown in these figures, a power supply transformer 1, a rectifier diode 2, a smoothing capacitor C1, and a bleeder circuit 3 are built into an adapter body 6 as a block of components. Further, an AC plug 5 to be connected to a commercial power supply is connected to the primary coil L1 of the power supply transformer 1 through an AC cord. Moreover, the secondary coil L2 of the power supply transformer 1 is led to the AC input terminals of the rectifier diode 2. Furthermore, the smoothing capacitor C1 is connected to between the positive output terminal and the negative output terminal of the rectifier diode 2.

Further, a positive line P+, which is a wire connected to the positive output terminal of the rectifier diode 2, and a negative line P−, which is a wire connected to the negative output terminal thereof, are connected to an output plug 4 through an output cord. Incidentally, in the following description, a voltage set within a range from an output voltage, at which an output current outputted from the output plug 4 has a maxim value, to an output voltage, at which the output current is 0, will be referred to as a "set voltage".

The bleeder circuit 3 connected in parallel to the smoothing capacitor C1 is configured as a block, in which electric current flows when a voltage developed across the terminals of the smoothing capacitor C1 (that is, a voltage between the positive line and the negative line) exceeds the set voltage. Thus, the bleeder circuit 3 has a transistor Q1, whose collector is connected to the positive line P+ through a current limiting resistor R1, and whose emitter is connected to the negative line P−. Further, the base of the transistor Q1 is connected to the anode of the Zener diode D1. This Zener diode D1 is an element adapted to feed a base current through the transistor Q1 when the voltage developed across the terminals of the smoothing capacitor C1 exceeds the set voltage. Thus, the cathode of the Zener diode D1 is connected to the collector of the transistor Q1 through the resistor R2 that limits the base current.

Hereinafter, an operation of this embodiment will be described.

Figure 5:
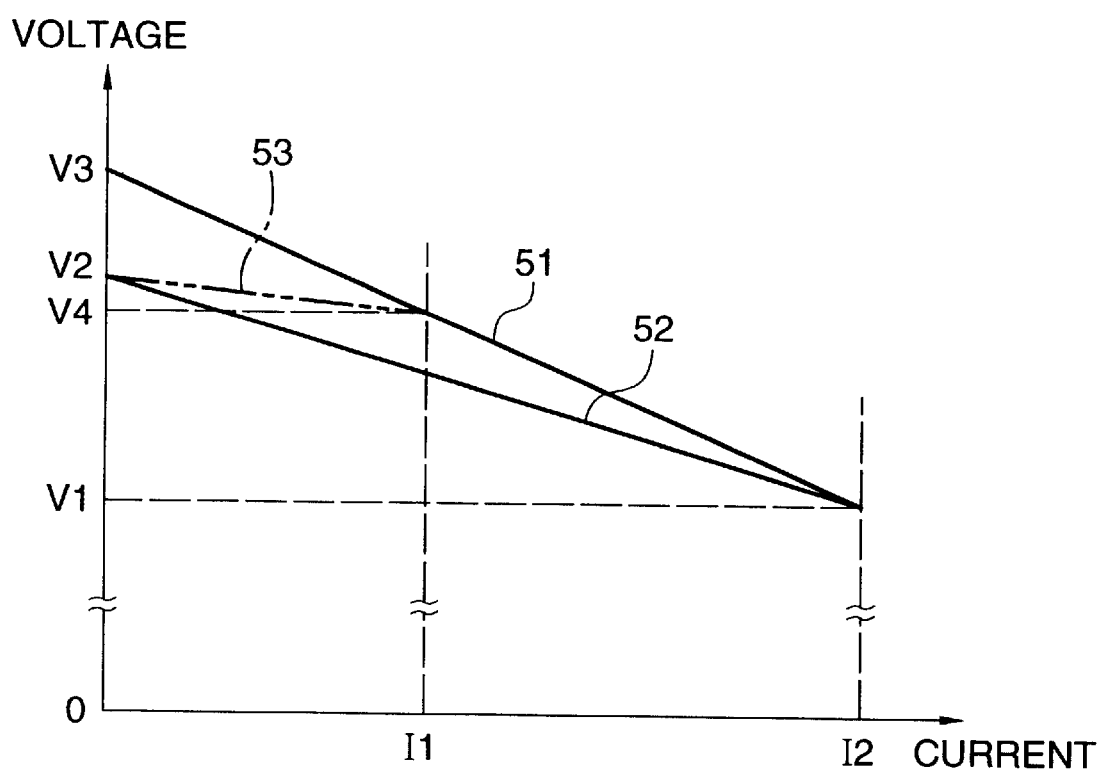
FIG. 5 is a graph illustrating the relation between an output voltage and an output current.

The power supply transformer 1 is a small-shaped transformer. Therefore, the impedance viewed from the side of the secondary coil L2 to the primary side is high, as compared with such impedance of a large transformer. Thus, in the case that the AC adapter does not have the bleeder circuit 3, a relation represented by a line 51 in FIG. 5 is established between the output current and the output voltage. That is, when the output current is I2, the output voltage is V1. However, when the output current decreases to 0, the output voltage rises to a voltage V3.

Assuming now that the set voltage set between the voltages V1 and V3 is V4, a Zener voltage ZV of the Zener diode D1 is set as follows:

ZV=V4−0.6.

Therefore, when the output current decreases to I1, and the output voltage exceeds V4, a base current flows in the transistor Q1 through the Zener diode D1. As a result, a bleeder current flows through a path consisting of the resistor R1 and the transistor Q1.

That is, when the output current is equal to or less than I1, a load current of a block (hereunder referred to as an "adapter DC source") consisting of the power supply transformer 1, the rectifier diode 2, and the smoothing capacitor C1 has a value obtained by adding the bleeder current to the output current. Further, when the output current decreases, the bleeder current increases in response to this decrease in the output current. Therefore, in the case that the output current decreases when viewed from the adapter DC source, the degree of decrease in the load current is restrained. Thus, the rise of the output voltage is suppressed. Consequently, when the output current is equal to or less than I1, a corresponding relation represented by a two-dot chain line 53 is established between the output current and the output voltage.

That is, when the output current decreases to 0, and the output voltage rises, electric current flows through the path consisting of the resistor R1 and the transistor Q1. Furthermore, when the current flows through the path consisting of the resistor R1 and the transistor Q1, the collector-emitter voltage of the transistor Q1 is maintained at a voltage that is nearly equal to the set voltage. On the other hand, the resistor R1 limits the current flowing through the transistor Q1. Thus, when the output current decreases to 0, the output voltage rises at a moderate rising rate. As a result, even when the output current reaches 0, the output voltage is suppressed to the voltage V2.

On the other hand, in the case that a load device (not shown) to be connected to the output plug 4 is suited to this embodiment, the current consumption of the load device is in the range from I1 to I2. Further, when the output current ranges from I1 to I2, no bleeder current flows through the bleeder circuit 3. Therefore, the heating value of the adapter body 6 in the case of connecting the device, which is suited to this embodiment, to the output plug 4 is equal to that thereof in the case that no bleeder current flows through the circuit 3. As a consequence, the rise in temperature of the adapter body 6 is equal to that thereof in the case that the bleeder circuit 3 is not provided therein. Consequently, the rise in temperature of the adapter body 6 is suppressed to a limiting value.

Further, on the other hand, when the output current is equal to or less than I1, a bleeder current flows the bleeder circuit 3. However, at that time, the current value viewed from the adapter DC source is equal to or less than I1, so that the bleeder circuit 3 produces heat, Whereas the power supply transformer 1 and the rectifier diode 2 generate almost no heat. Moreover, the heating value of the bleeder circuit 3 remains in a relatively low range. Thus, the rise in temperature of the adapter body 6 is suppressed to a limiting value.

Incidentally, the present invention is not limited to the aforementioned embodiment. Regarding the resistors R1 and R2, the AC adapter may be configured by omitting the resistor R1, or the resistor R2, or both the resistors R1 and R2.

Figure 3:
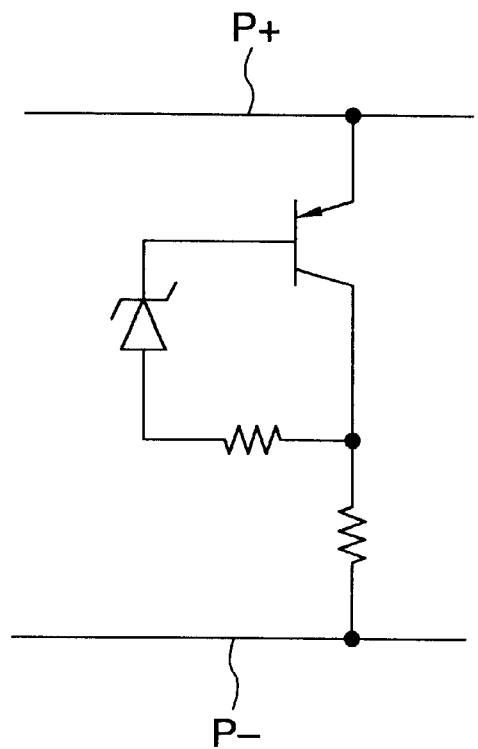
FIG. 3 is a circuit diagram illustrating the electrical connection in the case that a PNP transistor is used in a bleeder circuit.
Figure 4:
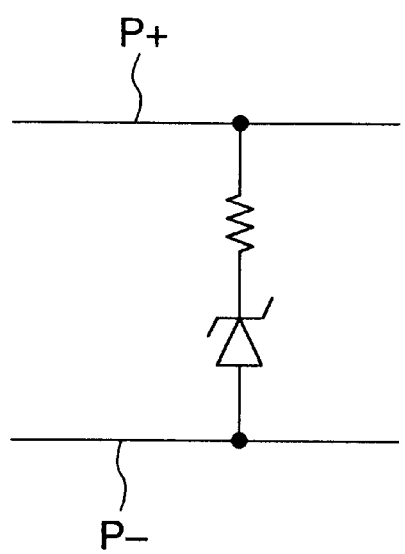
FIG. 4 is a circuit diagram illustrating the electrical connection in the case that a Zener diode is used in the bleeder circuit.

Further, although it has been described that the bleeder circuit is configured by using an NPN transistor, the bleeder circuit may be configured in other ways, for example, by using a PNP transistor, as illustrated in FIG. 3, or by connecting the resistor in series to the Zener diode, as illustrated in FIG. 4.

The DC power supply circuit according to aspect 1 comprises a power supply transformer having a primary coil, to which electric power is supplied from a commercial power supply, a rectifier diode for rectifying an output of a secondary coil of the power supply transformer, a smoothing capacitor for smoothing a rectified output outputted from the smoothing capacitor, and a bleeder circuit, connected in parallel to the smoothing capacitor and adapted to permit electric current to flow therethrough when an output voltage exceeds a set voltage that is set within a voltage range from an output voltage value, at which an output current has a maximum value, to an output voltage value at which the output current is 0. Therefore, when the output voltage is equal to or less than the set value, the bleeder current does not flow through the bleeder circuit. The heating value of the bleeder circuit is 0. On the other hand, when the bleeder current flows through the bleeder circuit, a value obtained by an addition of the values of the output current and the bleeder current is small. Thus, the bleeder circuit generates heat, while the power supply transformer and the rectifier diode produce almost no heat. Therefore, when the power supply transformer is miniaturized, increase in the heating value can be suppressed.

Further, the DC power supply circuit according to aspect 2 is configured so that the bleeder circuit comprises a transistor, whose collector is connected to one of the terminals of the smoothing capacitor, and whose emitter is connected to the other terminal thereof, and a Zener diode, adapted to feed a base current into the transistor when a voltage developed across the terminals of the smoothing capacitor exceeds the set voltage. Hence, the bleeder circuit is composed of one transistor and one Zener diode. Consequently, the configuration of the bleeder circuit can be simplified.

Moreover, the DC power supply circuit according to aspect 3 is configured so that a resistor is inserted between the collector and one of the terminals of the smoothing capacitor, and that the Zener diode has terminals, one of which is connected to the base of the transistor, and the other of which is connected to the collector thereof. Therefore, when the output current decreases to 0, and the output voltage rises, increase in the electric current flowing through the transistor is suppressed by the resistor. Consequently, even in the case that a voltage, at which electric current starts flowing through the bleeder circuit, is set at a low value, increase in the heating value of the bleeder circuit during the decrease in the output current can be suppressed.

Furthermore, the DC power supply circuit according to aspect 4 is an AC adapter. Therefore, even when the size of the AC adapter is reduced by miniaturizing the power supply transformer, the total heating value thereof remains at a limiting value. Thus, even when the size of the AC adapter is reduced, increase in the heating value thereof can be suppressed.

What is claimed is:

1. A DC power supply circuit comprising:
   a power supply transformer having a primary coil, to which electric power is supplied from a commercial AC power supply;
   a rectifier diode for rectifying an output of a secondary coil of said power supply transformer;
   a smoothing capacitor for smoothing a rectified output outputted from said rectifier diode and providing an output voltage; and
   a bleeder circuit, connected between a positive output line of said rectifier diode and a negative output line of said rectifier diode wherein said bleeder circuit is also connected in parallel to said smoothing capacitor and adapted to permit electric current to flow therethrough when said output voltage exceeds a predetermined set voltage wherein said predetermined set voltage has a value which is greater than a first output voltage value when an output current is zero and which is less than a second output voltage value when said output current has a maximum value.

2. The DC power supply circuit according to claim 1, wherein said bleeder circuit comprises;

a transistor, whose collector is connected to one of terminals of said smoothing capacitor, and whose emitter is connected to the other terminal thereof, and a Zener diode, adapted to feed a base current into said transistor when a voltage developed across the terminals of said smoothing capacitor exceeds the set voltage.

3. The DC power supply circuit according to claim 2, wherein a resistor is inserted between the collector and one of the terminals of said smoothing capacitor, and said Zener diode has terminals, one of which is connected to the base of said transistor, and the other of which is connected to the collector thereof.

4. The DC power supply circuit according to claim 1 is an AC adapter.

* * * * *